United States Patent [19]

McGinniss

[11] 4,035,274
[45] July 12, 1977

[54] DUAL CURE CATHODIC ELECTROCOATING

[75] Inventor: Vincent Daniel McGinniss, Valley City, Ohio

[73] Assignee: SCM Corporation, New York, N.Y.

[21] Appl. No.: 689,104

[22] Filed: May 24, 1976

[51] Int. Cl.$^2$ .................................... C25D 13/06
[52] U.S. Cl. ............................................. 204/181
[58] Field of Search ................................. 204/181

[56] References Cited

U.S. PATENT DOCUMENTS

| | | | |
|---|---|---|---|
| 3,501,391 | 3/1970 | Smith et al. | 204/181 |
| 3,501,432 | 3/1970 | Wright et al. | 204/181 |
| 3,708,413 | 1/1973 | Kehr et al. | 204/159.14 |
| 3,925,181 | 12/1975 | McGinniss | 204/181 |

Primary Examiner—Howard S. Williams
Attorney, Agent, or Firm—Jerry K. Mueller, Jr.

[57] ABSTRACT

An electrocoating composition containing a polymer having pendant tertiary amine groups, a polymer containing pendant mercaptan groups, an alpha-,beta-ethylenically unsaturated carbonyl cross-linking agent, and a photosensitizer can be electrodeposited onto a cathode substrate disposed within an aqueous electrocoating bath. Full cure of the electrodeposited coating on the cathode substrate is obtained by the combination of heat curing and ultraviolet radiation curing. In a specific embodiment of the present invention, a single polymer contains both the pendant tertiary amine groups and pendant mercaptan groups.

12 Claims, No Drawings

4,035,274

DUAL CURE CATHODIC ELECTROCOATING

CROSS-REFERENCE TO RELATED APPLICATIONS

This application is cross referenced to the following commonly assigned applications of applicant: U.S. Ser. No. 560,108 filed on Mar. 11, 1975; and U.S. Ser. No. 689,106 and 689,105 both filed on even date herewith. The disclosures of the listed applications are incorportated herein expressly by reference.

BACKGROUND OF THE INVENTION

This invention relates to electrodeposition of water dispersed polymers onto a cathode substrate and more particularly to cross-linking said electrodepositied polymers with a reactive alpha-,beta-ethylenically unsaturated carbonyl by a combination of heat curing and ultraviolet radiation curing.

Applicant's copending application U.S. Ser. No. 689,105 describes an electrocoating composition of a polymer having pendant mercaptan groups in combination with an alpha-,beta-ethylenically unsaturated carbonyl cross-linking agent which composition can be electrodeposited onto a cathode substate. This composition cures upon heating the electrocoated substrate or by ultraviolet irradiation of said electrocoating when an ultraviolet photosensitizer is incorporated into the composition. Ultraviolet radiation curing generally is preceded by lightly heating the electrocoating on the substrate in order to flow-out the electrocoating. The length of time the electrocoated substrate is exposed to the ultraviolet radiation can be decreased by increasing the viscosity or molecular weight of the electrocoating on the substrate.

The present invention takes advantage of the flowing-out step by obtaining a partial cure of the electrocoating during such light heating. Attendant with such partial curing is an increase in the molecular weight or viscosity of the electrocoating which allows a shorter time of subsequent ultraviolet irradiation of the coating to obtain full cure. Shorter total curing time of the electrocoating and total energy savings are thusly obtained.

SUMMARY OF THE INVENTION

A process for electrodeposition of an electrocoating composition dispersed in an aqueous electrocoating bath onto a cathode substrate disposed within said bath to form a electrodeposited coating on said cathode substrate, which comprises: cathodically electrodepositing said electrocoating composition onto said cathode substrate under cathodic electrocoating conditions, said electrocoating composition comprising: (a) a water-dispersed electrocoating polymer having at least about 1% by weight pendant mercaptan groups; (b) a water-dispersed electrocoating polymer having at least about 1% by weight pendant tertiary amine groups, each said amine group being attached to an alpha carbon of said polymer; (c) at least about 5% by weight of said polymers of an alpha-,beta-ethylenically unsaturated carbonl cross-linking agent having at least two alpha-,beta-ethylenically unsaturated carbonyl groups; and (d) at least about 0.5% ultraviolet photosensitizer by weight of said polymers, said pendant tertiary amine groups and said pendant mercaptan groups together comprising at least about 5% by weight of both said polymers; and curing said coating on said cathode substrate by heating said coating to cross-link said polymer having pendant mercaptan groups with said cross-linking agent to partially cure said coating, followed by irradiating with ultraviolet radiation said partially cured coating to cross-link said alpha carbon of said polymer having pendant amine groups with said cross-linking agent to fully cure said coating on said cathode substrate.

DETAILED DESCRIPTION OF THE INVENTION

The electrocoating composition contains an electrocoating polymer or polymers selected according to final use from a wide variety of polymers known in the electrocoating art.

Representative polymers can be derived from epoxy and epoxy-modified diglycidyl ethers of bis-phenol A structures, various aliphatic polyethylene or polypropylene glycol (diglycidyl ether) adducts, and glycidyl ethers of phenolic resins, such epoxy resins being commerically available when commonly used in the electrocoating field. Other useful polymers include polyamide resins generally having a molecular weight of between about 500 and about 5,000; acrylic resins having molecular weight of about 1,000 to about 100,000; polyester resins and polyurethane resins each having a molecular weight range of about 500 to about 5,000; vinyl resins; and amine resins. Various other useful electrocoating polymers can be advantageously employed in the electrocoating composition of this application as will be apparent to those skilled in the art.

Referring now to the polymer containing pendant mercaptan groups, the mercaptan groups can be attached to the polymer by esterification of free-hydroxl groups on the polymer (for example, a polyester) with a mercaptan-terminated acid, such as mercaptopropionic acid. Similarly, mercaptan groups can be introduced into the polymer by reacting pendant primary or secondary amine groups on a polymer with a mercaptan-terminated acid or by reacting the free-isocyanate group on a mono-isocyanate-terminated polymer with a mercaptan-terminated ester having at least two pendant mercaptan groups. Mercaptan groups can be introduced into the polymer by numerous other methods which are well known in the art and as further exemplified in the examples of this application. The mercaptan groups are pendantly attached to the polymer. For purposes of this application, pendant mercaptan groups include terminal mercaptan groups. By pendantly attached is meant that such mercaptan groups are attached to the polymer chain or to a pendant side chain of the polymer. The polymer containing pendant mercaptan groups should contain at least about 1% by weight of such pendant mercaptan groups, and up to about 30% if desired. Advantageously, the proportion of mercaptan groups will be at least about 1% by weight than the proportion of cross-linker and preferably the mercaptan groups will range from about 1% to about 4% by weight of the polymer to which they are attached. Generally, only a minor amount of mercaptan groups need be present in the electrocoating composition in order to obtain partial cure of the electrocoating by heating. Partial curing of the electrocoating builds molecular weight (viscosity) of the electrocoating which can permit shorter UV irradiation times and/or less energy expenditure during UV irradiation of the electrocoating. If a major amount of mercaptan groups are present in the electrocoating composition, then the light heating or flowing-out step is practiced at a temperature and for a time such that only partial curing of the electrocoating results by such heating.

Partial cure of the electrocoating composition results from lightly heating or flowing-out the electrocoating film on the cathode substrate with the pendant mercaptan groups linking with the ethylenically unsaturated carbonyl cross-linker by an addition polymerization reaction known as the Michael-type addition reaction, as more particularly described in "Organic Reactions," Vol. 10 (pages 179–555), John Wiley and Sons (1959), which is incorporated expressly herein by reference. The Michael-type addition reacts a mercaptan group with an alpha-,beta-ethylenically unsaturated carbonyl group in order to achieve linking of the mercaptan group with the unsaturation of the alpha-,beta-ethylenically unsaturated carbonyl group.

Referring now to the polymer containing pendant tertiary amine groups, tertiary amine groups can be attached to the polymer by reacting free secondary amine groups with any polymer containing oxirane functionality such as, for example, an epoxy resin or a glycidly-functional acrylic resin. Similarly, tertiary alkanolamines can be reacted with isocyanate-terminated polymers or esterified onto carboxyl-functional polyester polymers in order to attach the tertiary amine groups to the polymer. The tertiary amine groups are pendantly attached to the polymer. For purposes of this application, pendant amine groups include terminal amine groups. By pendantly attached is meant that such tertiary amine groups are attached to the polymer chain or to a pendant side chain of the polymer. The polymer containing pendant tertiary amine groups should contain at least about 1% by weight of such pendant amine groups and up to about 50% if desired. Advantageously, the polymer will contain only tertiary amine groups, though primary and secondary pendant amine groups can be present if desired. By ultraviolet irradiation of the electrocoated substrate, the alpha carbons of the pendant tertiary amine groups link with the ethylenic unsaturation of the cross-linker in the presence of an ultraviolet photosenitizer by free-radical addition polymerization. By alpha carbon of the tertiary amine group is meant the carbon in the alpha position relative to the amine group and to which the pendant teritary amine group is attached.

In a specific embodiment of the present invention, both the teritary amine groups and mercaptan groups are pendantly attached to the same polymer as more fully detailed in the Examples which follow.

The instant electrocoating composition also can contain a resin or polymer having multiple ethylenic unsaturation (free-radical reactors) such as multi-functional allylic unsaturated polymers, acrylics and methacrylics, acrylamides, unsaturated oils, and alkyds. Such ethylenically unsaturated compounds can polymerize into the electrocoating composition for obtaining good properties of the fully cured electrocoated film. The ethylenic unsaturation of allyic and vinyl unsaturated compounds is not activated (by a carbonyl group) and, thus, such unsaturated compounds do not participate in the Michael-type partial cure of the electrocoating by the heating step, but are linked into the electrocoated film by the ultraviolet radiation curing step.

Ethylenically unsaturated compounds include, for example, diallyphthalate, triallyborate, triallylamine, diallylmaleate, diallylchlorendate, diallylamine adducts of epoxy resins, and triallycyanurate. Additional unsaturated compounds include allyic unsaturated acrylics, epoxies, urethanes, and polyester polymers. Further ethylenically unsaturated compounds include alkyds synthesized with, for example, trimethylolpropane, pentaerythritol, phthalic anhydride, soybean oil, linseed oil, tung oil and the like.

The cross-linking agent is an alpha-,beta-ethylenically unsaturated carbonyl having alpha-,beta-ethylenic unsaturation capable of being reactive to cross-link the polymers of the electrocoating composition. The unsaturated cross-linking agent has at least two pendantly attached alpha-,beta-ethylenically unsaturated carbonyl groups of the following general structure:

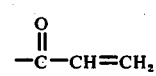

Each unsaturated carbonyl group is pendantly attached to a radical selected from the group cnsisiting of an alkyl, an aryl, and alkyl-aryl, and polymers having a molecular weight up to about 3,000. Pendantly attached unsaturated carbonyl groups are attached to the radical chain or to a said chain of the radical.

Preferably, the unsaturated carbonyl groups are attached to an oxgen molecule and are represented by the following general structure:

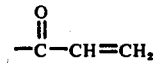

A preferred unsaturated cross-linking agent then is a multi-acrylate having at least two pendant acrylate groups. Specific preferred cross-linking agents which are particularly suited to the precepts of this invention can be selected from the group consisting of; ethylene glycol diacrylate, ethylene glycol dimethacrylate, 1,3-butylene glycol dimethacrylate, bisphenol A dimethacrylate, diethylene glycol diacrylate, pentaeryhritol triacrylate, pentaerythritol tetraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol A dimethacrylate, pentaerythritol tetramethacrylate, and polyethylene glycol dimethacrylate.

The preferred unsaturated cross-linking agents can be synthesized by various method, such as reacting hydroxyl-containing compounds with acrylyl chlorides or methacrylyl chlorides, direct esterification of hydroxyl-containing compounds with ethylmethacrylate, methylmethacrylate and the like. The preferred unsaturated cross-linking agents also can be produced by the transesterification of esters or polyesters with 2-hydroxyethylacrylate, 2-hydroxyethylmethacrylate, hydroxpropylmethacrylate and the like. The preferred unsaturated cross-linking agents can be produced additionally by reacting diisocyanates, polyisocyanates, or isocyanate-terminated polymers and prepolymers with hydroxyl-containing acrylic and methacrylic esters such as, for example, 2-hydroxyethlacrylate or hydroxypropylmethacrylate; by reacting epoxy polymers with acrylic acid or methacrylic acids; and by reacting carboxyl-containing compounds with glycidyl acrylates or glycidyl methacrylates. Further useful unsaturated cross-linking agents include acrylamides, vinyl ketones, and the like.

Ultraviolet (UV) sensitizers are combined with the electrocoating composition and are adapted to be simultaneously co-deposited with the composition onto the cathode substrate during the electrodeposition process. The UV sensitizers, responding to ultraviolet radiation, initiate the formation of an alpha carbon free-radical which links with the ethylenically unsaturated carbonyl cross-linker for full curing of the electrocoated film on the substrate. Useful UV sensitizers or photosensitizers include halogenated polynuclear ketones as disclosed in copending Ser. No. 480,738 filed June 19, 1974, U.S. Pat. No. 3,827,957, the same incorporated expressly herein by reference. Other suitable UV sensitizers include organic carbonyl compounds selected from alkyl phenones, benzophenones, and tricyclic fused ring compounds as disclosed in U.S. Pat. No. 3,759,807 and incorporated expressly herein by reference. Further useful UV sensitizers include carbonylated phenol nuclear sulfonyl chlorides such as set forth in U.S. Pat. No. 3,927,959, and expressly incorporated herein by reference. Additional useful photosenitizer combinations particularly suited for pigmented coatings are a combination of sensitizer comprising aromatic carbonyl compounds, aromatic aldehydes or aromatic ketones, and a synergistic sensitizer of about 0.05% to about 3% of 2,2'-dithiobis-(benzothiazole), as more particularly set forth in U.S. Pat. No. 3,847,771 and expressly incorporated herein by reference. At least about 0.5% by weight of ultraviolet sensitizer and preferably about 1 to 5% sensitizer is added to the polymers or polymer and thoroughly mixed or otherwise dispersed in the polymer phase prior to solubilizing the polymer in a aqueous dispersion.

Typical sources of ultraviolet energy ordinarily produce wavelength in the ultraviolet spectrum that are transmitted through quartz and such wavelengths are usually between about 1,000 A and 4,000 A, Suitable ultraviolet emitters include various electric arc lamps, plasma arc torch, such as described in U. S. Pat. No. 3,364,487, and lasers having a lasing output in the ultraviolet spectrum as disclosed in copending U.S. Ser. No. 189,254 (Now Abandoned); filed Oct. 14, 1971, the disclosures of said references being incorporated expressly herein by reference. Other suitable source of actinic light include quartz mercury lamps, ultraviolet quartz lamps, and high flash lamps.

In practicing this invention, the polymers are rendered water dispersible by adding sufficient acid to the polymers to completely neutralize the polymers. Appropriate acids are, for example, proton-donating acids such as phosphoric, sulfuric, hydrochloric, acetic, formic, lactic, and other proton-donating organic and inorganic acids. Water solubility is achieved by the protonating all of the tertiary amine groups of the polymer containing tertiary amine groups by the acid. The protonating of the tertiary amine groups also renders the polymer to which they are attached positively charged so that during electrodeposition the polymer can migrate to the cathode substrate and be deposited thereon. The polymer containing the pendant mercaptan groups can be water dispersed by the addition of alkyl halide or halogen to form sulfonium ion groups or otherwise conventionally dispersed in water. In a specific embodiment where both the amine and mercaptan groups are attached to the same polymer, protonation of the amine groups with acid efficiently effects water-dispersibility of the polymer.

The neutralized polymer phase (polymers and UV sensitizer) is blended with at least about 5% of the cross-linking agent by weight of the polymers and up to about 25% if desired. The blend then is dispersed in water to form an aqueous electrocoating bath of from about 5% to about 20% non-volatile dispersion. The bath generally is at about 60° to about 125° F., with about 70° to about 95° F, being preferred. The neutralized (protonated) polymers, the cross-linker and the UV sensitizer all are stable in bath. The cathode substrate to be electrocoated then in immersed in the electrocoating bath while an electric potential is maintained therethrough as disclosed in U.S. Pat. No. 3,619,398 the same being incorporated herein by reference. During electrodeposition the positively charged polymers along with the cross-linker and the UV sensitizer migrate to the cathode substrate. The protonated tertiary amine groups become de-protonated (lose protons) due to the electric potential applied. The polymers, the cross-linker, and the UV sensitizer are codeposited onto the cathode substrate. The electric potential applied to the bath generally is between about 20 and 500 volts. with about 50 to about 300 volts being preferred.

The coated substrate is removed from the bath and can be washed with water to remove excess coating. The electrodeposited coating on the cathode substrate then in dual cured with flow-out heating followed by ultraviolet irradiation in the presence of the UV sensitizer. Flow-out heating of the electrocoated film on the substrate is done at temperatures of about 180° to 400° F, for about 1 to about 20 minutes. Such flow-out or light heating evens out or flows-out the coating and partially cures the electrocoating by the linking of the unsaturation of the ethylenically unsaturated carbonyl cross-linking agent with the pendant mercaptan groups of the polymer containing the pendant mercaptan groups in a Michael-type addition reaction or addition polymerization. The partially cured electrocoated film then is fully cured by ultraviolet irradiation thereof. Details of ultraviolet radiation curing of the instant electrocoating composition can be as practiced in copending U.S. Ser. No. 480,738, the disclosure of which is incorporated expressly herein by reference.

The cathode substrate is an electrically conductive metal such as iron, steel, aluminum, copper, galvanized steel, zinc and like metals. The cathode substrate can be in the shape of bars, sheets, irregularly shaped forms with rounded or sharp edges and like shapes. The electrocoating composition can containing opacifying pigments and inert extender such as, for example, titanium dioxide, zinc oxide, clays such as kaolinite clays, silica, talc and the like.

The following examples show how the instant invention can be practiced, but should not be construed as limiting the invention. In the specification all parts are parts by weight, all percentages are weight percentages, and all temperatures are degrees Fahrenheit unless otherwise expressly indicated.

EXAMPLE 1

One mole (1,800 gms) of DER 664 epoxy resin (Dow Epoxy Resin, epoxide equivalent weight of 875–975, Dow Chemical Company) was reacted with 1.2 moles of methylethanolamine in 2-butoxy ethanol-1 solvent (50% by weight solution) in order to attach pendant tertiary amines to the epoxy polymer. The polymer having pendant mercaptan groups was commericially available Celanese Epicure 861 (equivalent weight of 163, Celanese Chemical Corp). One hundred fifty (150) grams of the Epicure polymer was dispersed in the solution containing the amine-functional epoxy polymer and the polymers completely neutralized with 5 moles of acetic acid.

The electrocoating bath comprised an 8% non-volatile solids blend of the neutralized polymers, 200 grams of melamine accrylate (2.7 acrylate functionality) cross-linker, and a UV sensitizer system comprising 5% benzophenone, 1% Michler's Ketone, and 3% of 2,2'-dithiobis(benzothiazole) The blend (electrocoating composition) was cathodically elecrodeposited onto a steel panel (cathode substrate) at 60 volts for 30 seconds.

The electrocoating covering the panel was lightly heated at 200° C. for 5 minutes and the heated electrocoated film displayed some solvent resistance, indicating that a partial cure of the film had taken place during the heating step. Full cure of the electrocoated film was obtained by irradiating the partially-cured film with ultraviolet radiation from an 800 watt medium pressure mercury lamp (ultraviolet radiation source) for 20 minutes.

EXAMPLE 2

The electrocoating composition was then electrocoating composition of Example 1, except that the polymer having pendant mercaptan groups, Celanese Epicure 861, was reacted with the amine-functional epoxy polymer to yield a signal polymer having both pendant tertiary amine groups and pendant mercaptan groups.

This electrocoating composition was dispersed in the bath, electrodeposited onto a steel panel, and dual cured in the same manner as described in Example 1. A fully cured electrocoated film covered the panel upon the dual curing thereof.

EXAMPLE 3

The procedure of Example 1 and 2 were repeated except that the polymer having pendant mercaptan groups was trimethylolethane tri-(3-mercaptopropionate). Again, a fully cured electrocoated film covered the panel upon the dual curing thereof.

EXAMPLE 4

Example 1 was repeated, except that 10% of trimethylolpropane-triacrylate and 15% of triallyl cyanurate were added to the bath. Triallyl cyanurate contains a multiplicity of ethylenically unsaturated carbon-to-carbon groups, but such unsaturation is not activitated (by a carbonyl group). The triallyl cyanurate and the trimethylolpropanetriacrylate both linked into the electrocoated film upon the UV irradition of the electrocoated film (subsequent to the partial heat curing of the electrocoating to yield a fully cured electrocoated film on the panel.

EXAMPLE 5

A polyester was prepared by reacting one mole of phthalic anhydride, one mole of succinic anhydride, and one mole of propylene glycol. This reaction was preformed in toluene with azeotropic distillation of the water of reaction. This reaction product, an acid-terminated polyester, then was reacted with two moles of N,N-diethyl-1,4, pentanediamine (with the water of reaction being removed) in order to attach pendant tertiary amine groups to the polyester polymer.

The polymer containing pendant mercaptan groups was a mercaptanterminated polyurethane polymer prepared by reacting 2 moles of toluene diisocyanate with one mole of poly-(tetramethylene ether glycol) (molecular weight of about 2,000), followed by a further reverse addition reaction with 2 moles of trimethylolpropane tri-(beta-mercaptopropionate).

The diamine-terminated polyester polymer and the mercaptanterminated polyurethane polymer were completetly neutralized with 6 moles of acetic acid, and blended with 20% by weight of pentaerythritoltriacrylate (cross-linking agent) and 10% by weight of the UV sensitizer system of benzophenone/diethoxyacetophenone (1:1 weight ratio). The blend was dispersed in demineralized water to form an electrocoating bath of 10% non-volatile solids.

A steel panel was cathodically electrocoated with the electrocoating composition, washed with water to remove excess coating, and dual cured in a manner similar to that described in Example 1. A fully cured electrocoated film covered the panel upon the dual curing thereof.

EXAMPLE 6

Example 5 was repeated, except that to the electrocoating composition (blend) was added 20% by weight of an unsaturated alkyd compound which was the reaction product of 60 parts refined soybean oil, 16 parts trimethylopropane, 24 parts phthalic anhydride, and 2 parts pentaerythritoltriacrylate (all parts are parts by weight). The alkyd compound polymerized into the electrocoated film upon dual curing of the electrocoated film to yield a fully cured electrodeposited coating covering the panel.

EXAMPLE 7

One mole of a polypropylene oxide polymer (PPG 1025, molecular weight of about 1,000, Union Carbide Corp.) was reacted with 2 moles of toluene diisocyanate (molecular weight of 174.16) in dry 2-ethoxy ethanol-1 to form a diisocyanate-terminated prepolymer. Pendant tertiary amine groups were attached to the prepolymer by reacting the pre-polymer with 1.943 moles of N, N-dimethylethanol-amine (molecular weight of 89.14). Pendant mercaptan groups also were attached to the prepolymer by reacting the amine-functional prepolymer with 0.057 moles of the reaction product of neopentylglycol and mercaptopropionic acid, the reaction product being neopentylglycol dimer-captopropionate (molecular weight of 280.40). The polymer contained about 11% pendant tertiary amine groups and about 1% pendant mercaptan groups (based on the weight of the polymer).

The polymer was neutralized with acetic acid and blended with 20% by weight melamine acrylate cross-linker and a UV photosensitizeer system comprising 5% benzophenone, 1% Michler's ketone, and 3% of 2,2'-dithiobis-(benzothiazole). The blend (or electrocoating composition) was let down in deionized water to form an electrocoating bath of 8% non-valatile solids and cathodically electrodeposited onto a steel panel at 60 volts for 30 seconds.

The coated panel was heated at 300° F. for 10 minutes and this heating resulted in a partial cure of the electrocoated film (indicated by its moderate resistance to solvents) with attendant molecular weight increase. The partially cured coating then was fully cured by subjecting the coating to UV irradiation from an 800 watt medium pressure mercury lamp under a polyethylene sheet.

EXAMPLE 7a

An advantage of dual cure as practiced in this invention is this advantageous molecular weight build-up obtained by the heating step which can permit shorter UV irradiation times. To demonstrate this advantage, an elctrocoating bath was prepared in the manner set forth in Example 7, except that the mercaptan-functional polymer (neopentyloglycol dimercaptopropionate) was omitted from the electrocoating composition. A panel was cathodically electrocoated and heated in the same manner as described in Example 7. This electrocoated film display no solvent resistance after heating, indicating that no cure of the electrocoated film had taken place. Full cure of the electrocoating was obtained after 30 minutes of UV irradiation time or 10 minutes UV irradiation exposure time longer than the inventive electrocoating composition of Example 7 containing only 1% mercaptan groups.

EXAMPLE 8

The procedure of Example 7 was repeated except that 15% triallyl-cyanurate was added to the electrocoating composition. Dual cure of the electrocoated film resulted in a fully cured film covering the panel, indicating that the ethylenically unsaturated compound, triallylcyanurate, had linked into the coating system.

EXAMPLE 9

The procedure of Example 7 was repeated, except that the blend also contained 30% by weight of an unsaturated alkyd compound which was the reaction product of 60 parts refined soybean oil, 16 parts trimethylol-propane, 10 parts maleic anhydride, 14 parts phthalic anhydride, and 2 parts pentaerythritoltriacrylate (all parts are weight parts). A fully cured coating covered the panel upon the dual cure of the electrodeposited coating.

EXAMPLE 10

The procedure of Example 7 was repeated, except the polymer having pendant mercaptan groups was trimethylolpropane tri(beta-mercaptopropionate). A fully cured coating covered the panel upon the dual curing of the electrodeposited coating.

EXAMPLE 11

The epoxy resin of Example 1 (DER 664) was reacted with 1 mole of methylethanolamine in 2-butoxy ethanol-1 (in order to attach pendant tertiary amine groups) followed by further reaction with 0.5 moles of trimethylolpropane-tri-(beta-mercaptopropionate) (in order to attach pendant mercaptan groups).

The resulting polymer was neutralized with acetic acid and blended with 20% by weight of melamine acrylate and a UV sensitizer system composed of 5% benzophenone, 1% Michler's ketone, and 3% of 2,2'-dithiobis-(benzothiazole). The blend was added to water to form an electrocoating bath of 10% non-volatiles.

A steel panel was immersed in the bath and cathodically electrocoated at 60 volts for 30 seconds. The coated panel then was dual cured in the same manner as described in Example 7.

EXAMPLE 12

An acrylic polymer was formulated by the solution polymerization of 40% styrene, 40% butyl acrylate, and 20% glycidyl methacrylate in 2-butoxy ethanol-1 solvent with azeotropic distillation of the water of reaction. Pendant tertiary amine groups and pendant mercaptan groups were attached to the polymer by reacting the acrylic polymer with 10% of diallylamine and 5% of neopentylglycol dimercaptopropionate by weight respectively.

The cross-linking agent was 20% by weight of hexanedioldiacrylate/pentaerythritoltriacrylate (1:1 weight ratio). The UV sensitizer system was 5% benzophenone, 1% Michler's ketone and 3% of 2.2'-dithiobis-(benzothiazole). The bath was formed, a panel cathodically electrocoated, and the resulting electrodeposited film dual cured in the same manner as described in Example 7. A fully cured, solvent-resistant coating resulted from the dual cure of the electrodeposited coating.

EXAMPLE 13

The procedure of Example 1 was repeated that the cross-linking agent was an equal weight mixture of N,N-methylenebis-acrylamide and triacrylamido-s-triazine. A fully cured, solvent-resistant coating resulted from the dual cure of the electrodeposited coating.

EXAMPLE 14

The procedure of Example 1 was repeated that the cross-linking agent was the reaction product of 2 moles of N-methylol-acrylamide with 1 mole of isophorene diisocyanate. A fully cured, hard, flexible, solvent-resistant coating resulted from the dual cure of the electrodeposited coating.

I CLAIM
1. A process for electrodeposition of an electrocoating composition dispersed within an aqueous electrocoating bath onto a cathode substrate dispersed dispersed within an aqueous electrodeposited coating on said cathode substrate, which comprises:
   cathodically electrodepositing said electrocoating composition onto said cathods substrate under cathodic electrocoating conditions, said electrocoating composition comprising
   a. a water-dispersed electrocoating polymer having at least about 1% by weight pendant mercaptan groups;
   a water-dispersed electrocoating polymer having at least about 1% by weight pendant tertiary amine groups, each said amine group being attached to an alpha carbon of said polymer;
   c. at least about 5% by weight of said polymers of an alpha-, beta-ethylenically unsaturated carbonyl cross-linking agent having at least two alpha-,beta-ethylenically unsaturated carbonyl groups; and
   d. at least about 0.5% ultraviolet photosensitizer by weight of said polymers,
   said pendant tertiary amine groups and said pendant mercaptan groups together comprising at least about 5% by weight of both said polymers; and curing said electrodeposited coating on said cathode substrate by heating said electrodeposited coating on said cathode substrate to cross-link said polymer having pendant mercaptan groups with said cross-linking agent to partially cure said coating, followed by irradiating with ultraviolet radiation said partially cured coating to cross-link said alpha carbon of said polymer having pendant amine groups with said cross-linking agent to fully cure said coating on said cathode substrate.

2. The electrodeposition process of claim 1 wherein said polymer having pendant amine groups is dispersed in said bath by protonating said amine groups with proton-donating acid, said protonated amine groups becoming deprotonated upon electrodeposition of said polymer having said protonated amine groups onto said cathode substrate.

3. The electrodeposition process of claim 1 wherein said polymer having pendant mercaptan groups is dispersed in said bath by the addition of alkyl halide or halogen thereto to form pendant sulfonium ion groups from said mercaptan groups.

4. The electrodeposition process of claim 1 wherein said polymer havng pendant mercaptan groups contains between about 1% and about 4% by weight of said polymer of said pendant mercaptan groups.

5. The electrodeposition process of claim 1, wherein said electrocoating composition additionally contains an ethylenically unsaturated compound having a multiplicity of ethylenic unsaturation.

6. The electrodeposition process of claim 1 wherein said cross-linking agent is an acrylate cross-linking agent having at least two pendant acrylate groups.

7. The electrodeposition process of claim 1 wherein said cross-linking agent is an acrylamide cross-linking agent having at least two pendant acrylamide groups.

8. A cathode substrate having thereon an electrodeposited coating from the electrocoating process of claim 1, said coating having been cured by heating followed by ultraviolet irradiation of said coating on said cathode substrate.

9. A process for electrodeposition of an electrocoating composition dispersed within said bath to form a curable electrodeposited coating on said cathode substrate which comprises:

cathodically electrodepositing said electrocoating composition onto said cathode substrate under cathodic electrocoating conditions, said electrocoating composition comprising:

a. a water-dispersed electrocoating polymer having at least about 1% by weight pendant tertiary amine groups and said polymer having at least about 1% by weight pendant tertiary amine groups, each said amine group being attached to an alpha carbon of said polymer, the total proportion of both said amine groups and said mercaptan groups being at least about 5% by weight of said polymer;

b. at least about 5% by weight of said polymers of an alpha-,beta-ethylenically unsaturated carbonyl cross-linking agent having at least two alpha-,beta-ethylenically unsaturated carbonyl groups; and c. at least about 0.5% ultraviolet photosensitizer by weight of said polymer; and curing said electrodeposited coating on said cathode substrate by heating said electrodeposited coating to cross-link said pendant mercaptan groups with said cross-linking agent to partially cure said coating, followed by irradiating with ultraviolet radiation said partially cured coating to cross-link said alpha carbon with said cross-linking agent to fully cure said coating on said cathode substrate.

10. The electrodeposition process of claim 9 wherein said cross-linking agent is an acrylate cross-linking agent having at least two pendant acrylate groups.

11. The electrodeposition process of claim 9 wherein said cross-linking agent is an acrylamide cross-linking agent having at least two pendant acrylamide groups.

12. A cathode substrate having thereon an electrodeposited coating from the electrocoating process of claim 9 said coating having been cured by heating followed by ultraviolet irradiation of said coating on said cathode substrate.

* * * * *

UNITED STATES PATENT AND TRADEMARK OFFICE
CERTIFICATE OF CORRECTION

PATENT NO. : 4,035,274
DATED : July 12, 1977
INVENTOR(S) : Vincent Daniel McGinniss It is certified that error appears in the above-identified patent and that said Letters Patent are hereby corrected as shown below:

Column 2, line 55, after the word "1%" insert -- less -- .

Column 4, lines 29 through 33, the formula should appear as follows:

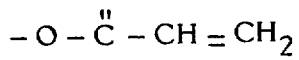

Column 7, line 29, replace the word "then" with -- the same as the -- .

Column 10, lines 26, after the word "repeated" insert -- except -- .

Column 10, line 33, after the word "repeated" insert -- except -- .

Column 10, in the Claims, cancel lines 40 through 44 and replace with the following:

-- 1. A process for electrodeposition of an electrocoating composition dispersed within an aqueous electrocoating bath onto a cathode substrate dispersed within said bath to form a curable electrodeposited coating on said cathode substrate, which comprises:

Column 11, line 40, after the word "within" insert -- an aqueous electrocoating bath onto a cathode substrate dispersed within -- .

Column 12, line 8, after the word "pendant" insert -- mercaptan groups and said polymer having at least about 1% by weight pendant -- .

Signed and Sealed this

Eighth Day of November 1977

[SEAL]

Attest:

RUTH C. MASON
*Attesting Officer*

LUTRELLE F. PARKER
*Acting Commissioner of Patents and Trademarks*